United States Patent [19]

Conner

[11] 4,369,157
[45] Jan. 18, 1983

[54] METHOD OF AUTOMATICALLY DECORATING ARTICLES AS THEY ARE IN-MOLD FORMED AUTOMATICALLY

[75] Inventor: Francis J. Conner, Boonton, N.J.

[73] Assignee: Dri-Print Foils, Inc., Rahway, N.J.

[21] Appl. No.: 786,642

[22] Filed: Apr. 11, 1977

[51] Int. Cl.³ .............................................. B29C 9/00
[52] U.S. Cl. ................................. 264/246; 264/266; 264/328.16; 425/112; 425/129 R
[58] Field of Search .............. 425/112, 122, 121, 385, 425/129; 264/509, 266, 254, 328.1, 275, 259, 328.16, 246, 245, 247

[56] References Cited

U.S. PATENT DOCUMENTS

| 2,891,340 | 6/1959 | Markus et al. | 264/266 X |
| 3,122,598 | 2/1964 | Berger | 264/266 X |
| 3,417,175 | 12/1968 | Brown et al. | 264/245 X |
| 3,502,760 | 3/1970 | Ono | 264/247 X |
| 3,651,191 | 3/1972 | Glatt et al. | 264/266 X |
| 3,654,062 | 4/1972 | Loew | 264/246 X |
| 3,743,458 | 7/1973 | Hallauer et al. | 425/129 R X |

OTHER PUBLICATIONS

Hochner, 1968 Modern Plastics Encyclopedia, pp. 1036, 1038 & 1040.
Neumann, 1976-1977 Modern Plastics Encyclopedia, p. 438, Oct. 1976.

*Primary Examiner*—Mark Rosenbaum
*Attorney, Agent, or Firm*—Ronald G. Goebel

[57] ABSTRACT

A novel method of automatically decorating articles as they are formed, in-mold, of heated plastics flowing within and filling mold cavities. Pursuant to the invention an elongated tape or strip of decorating material is automatically advanced and pre-fed and positioned in the molds at each molding cycle, interfacing therein automatically with the plastics as they fill the molds under heat and pressure; as the article is thus formed, the decorating material forms therewith a unitary, permanent decorating part thereof.

27 Claims, 8 Drawing Figures

METHOD OF AUTOMATICALLY DECORATING ARTICLES AS THEY ARE IN-MOLD FORMED AUTOMATICALLY

OBJECTS OF THE INVENTION

This invention relates to a novel method, and procedure for achieving an infinite range of desired external appearances and optical and esthetic effects, such as simulated woodgrains, textures, marble, leather, single or multi colors, metallized, random, selective or solid decorations on plastic molded article substrates.

The need has existed in the industry for procedures for providing inexpensive base substrates and materials, such as plastics and other moldable materials, with the appearance of more costly and esthetically attractive materials, without substantial increase in cost or delay in production.

The invention solves the need by providing a method of forming surface simulating coatings and decorations automatically in the molds, during the molding cycles of plastics or other materials, which flow, when heated to fill the mold cavity to the desired contours of the three-dimensional article being molded. The invention thus forms such articles, within the molding machine and, simultaneously with the so molded part or article, providing it with the predetermined surface decorations as a unitary part thereof.

BACKGROUND AND OBJECTS OF THE INVENTION

The manufacture of articles of plastic materials by molding is expanding greatly, due to the relatively low cost, high strength to weight and simplicity of manufacture of articles of even the most complex contours necessary for a variety of end uses, and high speed of production (such plastic articles being usually plurally formed at each molding cycle). Molding machines accurately and reliably produce such articles, at each molding cycle, to precisely the contours of the mold cavity, which, in turn, are predetermined and preformed to produce the exact contours of articles desired. Such molding machines operate on sequential cycles, materials being fed into the mold cavities and heated under pressure and cooled, and the articles ejected—all under precisely sensed, sequenced and controlled time, temperature, pressure, heating, cooling, molding, ejecting and mold opening, article ejecting and mold closing procedures—all cycled, timed and pre-programmed by instrumentation and controls.

All of the just mentioned factors and the various forms of molding apparatus and molding procedures such as injection, extrusion, are old and well known to those skilled in the art—cf. "Tool Engineers Handbook" First Edition (1949) ASTE Handbook Committee, pages 392-399 showing and explaining forms of molding procedures and machines well known in this art; page 398 shows, "FIGS. 21-19—Sectional View illustrating general methods employed in injection molding—. pages 397, 399 describe sequences of operations including the heating, cooling steps. Pages 397, 398 describe sequences of the molding cycles, including heating mediums, heat sensing thermocouples, movable and stationary parts of molds, mold cooling channels, means including sprues and runners feeding plastic granules into the molds, guide pins aligning the molds in their opening and closing operations and sequences.

The contours of such plastic articles frequently include angular and other irregular portions which are difficult to form except by molding. While plastic articles may be precisely accurately molded, it is desirable to apply surface decorations to such plastic articles, for relieving the solid color appearance thereof and in order to simulate various surface and external esthetic appearances and effects. Such decorating would enhance the esthetic appearance and protect the surfaces of such articles. Surface decorating of plastic articles has however proven difficult; attempts to impress decorating surfaces on plastic articles may stress and strain them and necessitated special, costly and unreliable additional handling and completing steps, adding greatly to the cost of and time required for production thereof.

The foregoing and other problems encounted in contemplated surface decoration of plastic articles are overcome by the method and process of the present invention, which enables plastic articles to have any of an infinite variety of surface decorations desired, pleasing to the eye and to the sense of touch, formed unitarily with and during the molding of the articles, without stress or strain. Such decorations are, pursuant to the invention, applied to the articles automatically, within the mold and in the molding cycle. As the plastic material flows into and fills the mold under heat and pressure, forming the plastic article, the surface decoration preselected therefor is simultaneously automatically bonded to and forms an integral part of the article. Thus, pursuant to the present invention, at the conclusion of the molding cycle, and without any further step being required, when the mold is opened and the molded article is removed, it will have been formed, with the pre-selected surface decoration in-mold formed thereon, achieving the decorated appearance of the article.

Further advantages of the procedure of the invention include: permanent interfacial adherence, integrally achieved in-mold on the substrate as molded and heat activated. The appearance of woodgrain and other decorating effects on plastic parts of various configurations, contours, shapes and angles may be readily and accurately achieved; this is not achievable under conventional procedures. Pre-selected surfaces of injected molded parts may be decorated by selective alignment and positioning of the in-mold decorating tape relative thereto. The decoration tape pursuant to the procedure of the invention, automatically conforms to and combines with the specific three-dimensional contours of the plastic articles, as molded.

DESCRIPTION OF THE DRAWINGS

The invention is exemplarily illustrated in the drawings, wherein similar reference characters indicate like parts, and wherein.

DESCRIPTION OF PREFERRED EMBODIMENTS OF THE INVENTION

Pursuant to the invention, a sheet, web, tape or carrier, exemplified in the drawings as a continuous decorating tape or strip 26 (of continuous or indeterminate length) of normally inert thermoforming properties is provided, which, during the molding cycle, conforms to the shape, angles, recesses and contours of the plastics articles defined by the mold cavity as molded therein in repeated continuous cycles. The term "plastic article" as used herein shall be deemed to include articles formed of materials heated to flow or otherwise fill a cavity in molds solidifying under heat and or pressure to three-dimensionally form the articles so defined by the mold cavity. The in-mold decorating strip or tape is inserted into molds; the molding materials are positioned in the mold. The flow and pressure of the hot plastic materials activate the decorating strip or tape to release and permanently unite with and form the decorating surfaces of the plastic articles, eliminating the need for any extra, post-molding decorating, handling, registration and application procedures and steps. An infinite variety of decorating effects can be produced pursuant to the invention; gloss levels of 15% to 90% gloss on the 60° Gardner glossometer, with or without ticking, can be thus reproduced; any other desired surface decoration appearance can be formed on the surfaces of the articles being molded, in automatic repetitive cycles. As the molding machine completes a cycle, the in-mold decorating strip or tape advances into position for the next (repetitive) cycles.

Figure 1:
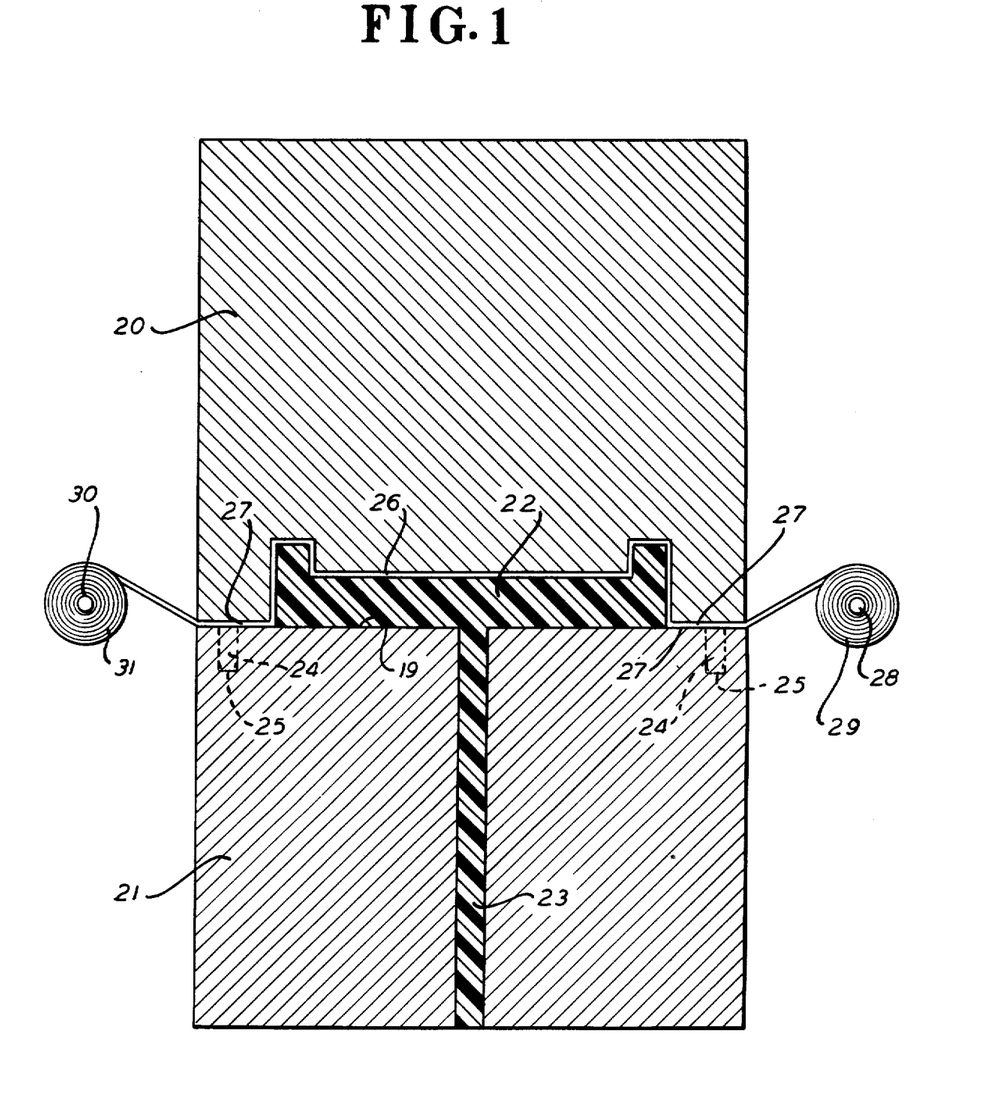
FIG. 1 is a vertical, elevational, partly sectional view of a molding apparatus with a surface decorating strip or tape, pursuant to the invention, positioned in the molding machine, for surface decoration of the article as molded.
Figure 2:
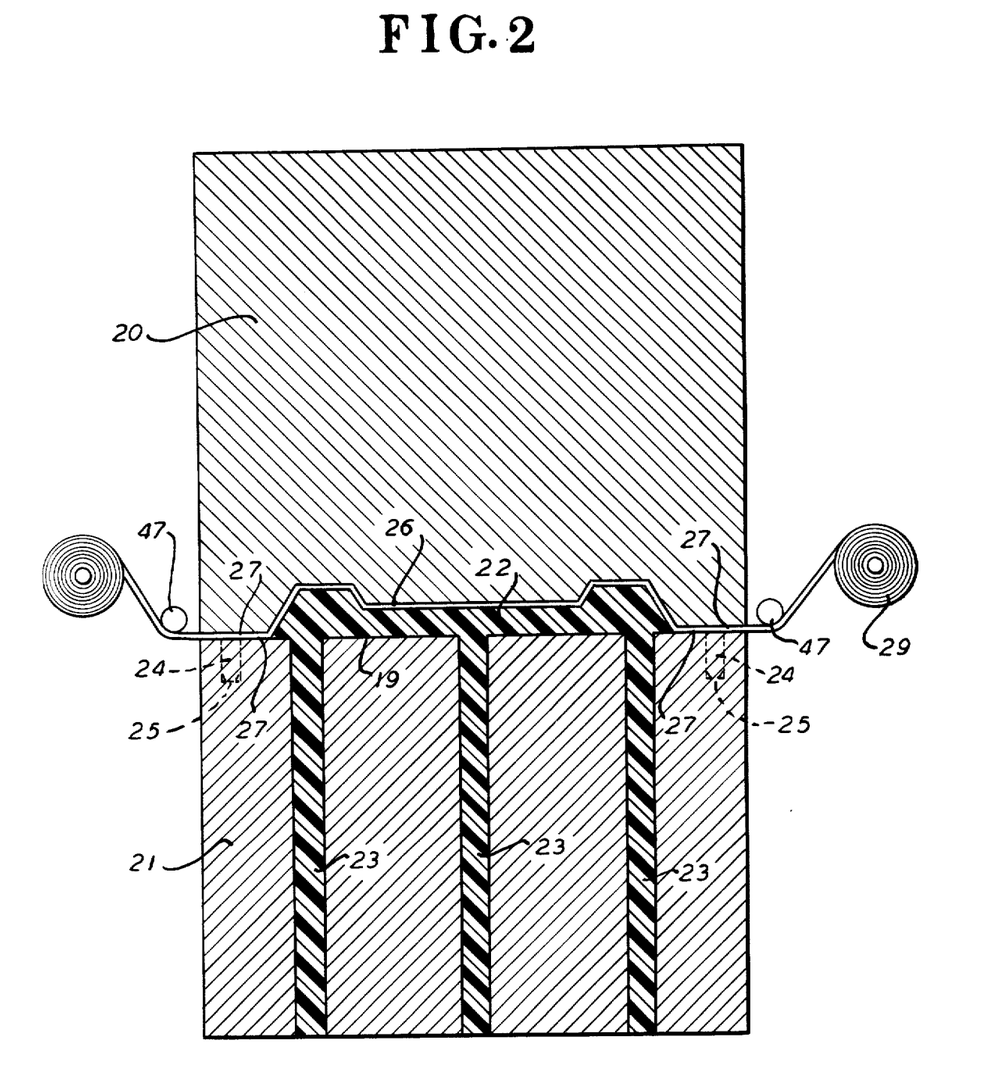
FIG. 2 is a similar view of another form of apparatus embodying the invention.
Figure 8:
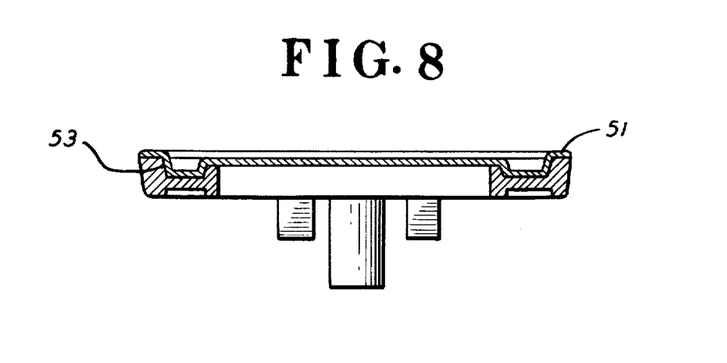
FIG. 8 is a vertical elevational, sectional view thereof, taken at line 8—8 of FIG. 7.

In the examples given in FIGS. 1 and 2 the plastic resins, compounds, powders, pellets or other materials 22 are introduced into the mold cavity 19 as through runners, sprues or other material passageways 23 in the molds leading to the material defining cavity 19, which is formed in the mold sections 20, 21 of complementary form to the desired contours and dimensions of the plastic articles, such as exemplified at 50 (FIG. 8). In operation of the molding cycle, the molds are closed and the mold cavity 19 is filled with plastics materials 22. Heating and pressure and cooling systems and other means are provided in or on the molds; controls regulate the sensing, timing and heating of the plastics materials 22 to flowable state and cause them to flow under pressure into cavity 19 and form the articles desired. The molds may be allowed to cool or chill to cause or expedite finalizing or setting of the plastic materials; the molds are opened and the thus molded parts ejected or discharged and the molds closed and the molding cycle repeated. Guide pins 24 may be secured to one of the molds for complementary registration with openings 25 in the other mold. The mold filling, heating, cooling, and article removing and ejecting steps or cycles may thus be timed and sequenced and controlled by suitable or convenient instrumentation and means well-known in the plastics art.

Pursuant to the invention, strip or tape 26 is (FIGS. 1, 2) fed to and positioned in the molds with the adhesive coating 35 (FIGS. 3-6) facing the direction of entry of the plastic materials into cavity 19, so that, as such plastic materials flow under heat and pressure into and fill the mold cavity, they will automatically interface with and press on and against the strip or tape 26; under the influence of contact of the plastic materials therewith under heat and pressure, the release and adhesive coatings 34, 35 of the strip or tape 26 bond the decorating layers 32 of strip 26 to the plastic substrate or article as the latter is formed in the molding cycle, and the carrier layer 31 is released from the decorating coatings.

Pursuant to the invention, the decorating strip or tape 26 (herein designated as "tape 26") is (FIGS. 1, 2) positioned in the molds 20, 21 as at the interface 27 of the molds. Said strips or tapes, thus interposed between the molds, are so positioned in the molds at said interface from a suitable source of supply for the decorating strip or tape 27, such as a continuous roll 29, preferably (FIGS. 1, 2) mounted, as at 28, on a suitable bearing or axis generally aligned with the interface 27 of molds 20, 21. Tape 26 may (FIG. 2) pass around idler rolls 47 between the axes 28, 30 and the interface 27 of the molds, for registration with said interface. Supply roll 29 may be mounted outwardly of the molds and tape 26 may be passed through and positioned at interface 27 intermediate the molds and across cavity 19 of the molds and to a take-up position 31 on core or axis 30. The tape supply and take-up axes 28, 30 may be sequenced and keyed into and synchronized with the cycle timing system of the molding machines, of which molds 20, 21 form a part, to automatically advance a desired length of strip 26 intermediate molds 20, 21, for automatic, in-mold decoration of the plastic articles as molded and to advance the remaining carrier portion 31 (FIGS. 3-6) of the tape, on completion of the simultaneous articles forming and decorating cycle pursuant to the invention, out of the molds. The adjacent, next, fresh, complete strip is introduced into the molds, thus repeating the decorating procedure of the invention at each next molding cycle.

As above described, in the molding cycle, the articles-forming plastic materials, pursuant to the invention, are introduced into the mold cavity 19 wherein they contact and bond with the decorating portion 32 of tape 26 in the article-forming, in-mold cycle. Said decorating portion may comprise one or more decorating coatings, plus other coatings such as carrier release and substrate adhering coatings, shown exemplarily and without limitation thereto, in FIGS. 3-6. The decorating 32 portion of tape 26 attains the in-mold decoration of the article. The carrier portion 31 of the strip is advanced out of the molds, on completion of the article forming and decorating procedure; the articles are ejected and carrier 31 then serves as a "leader" for drawing the next or adjacent predetermined desired length of decorating tape into the molds for repetition of the article forming, decorating molding cycle.

The layers or coatings 32 may be of any desired or convenient composition and form and may include release coating 34 formed separately (FIGS. 4 and 5) and interposed between carrier 31 and the underlying decorating or other coatings. A suitable adhesive coating or layer 35, may be provided (FIGS. 5, 6) inert at room temperatures but thermally activated at molding temperatures. Coating 35, which may be formed separately or with other coatings as below described, adheres the decorating coatings to the molded substrate, such as plastic article 33 (FIG. 7) as it is molded in the molding cycle. Color and combined adhesive coating 42 (FIG. 3) may be provided.

The release layer or coating 34 may (FIGS. 4, 5) be formed as a separate layer or coating or combined with other coatings or materials as below described. A primer coating 38 may (FIGS. 3, 4, 5) be coated onto the carrier 31; abrasion coating 39 (FIG. 4) or multiple abrasion coatings 39 and 40 (FIG. 5) or base-abrasion coatings 41 (FIGS. 3 and 6) may be provided. Pattern coatings may be of any desired color or combinations of colors. Single or multiple color coatings 36, 37 may be provided.

A vacuum metallizing layer or coating 45 may be provided (FIG. 6); said coating or layer 45 may be of gold, silver, aluminum, nickel or other metals, vacuum or otherwise deposited onto coating 41 (FIG. 6) or onto coating 36 by thermal evaporation or cathodic sputtering techniques, applied in vacuum chambers; gold, red and other metallizing coating appearances may be achieved by combining metallizing coatings with lacquer or other color coatings to achieve the desired metallized hue or color effects. The surface decorating surface 51 (FIG. 7) is formed in-mold on article 33 by decorating tape 26 pursuant to the invention.

The decorating coatings are automatically activated and separable from carrier strip 31 at the molding temperature of the plastic article forming materials; the decorating tape, at molding temperatures, automatically tracks and adheres to and unites with and bonds to the article lines, becoming a homogeneous, integral part thereof. Thus any of an infinite variety of pre-selected surface decorations desired may be formed, pursuant to the invention, exemplified in the wood-grain pattern 50 (FIG. 7).

Figure 7:
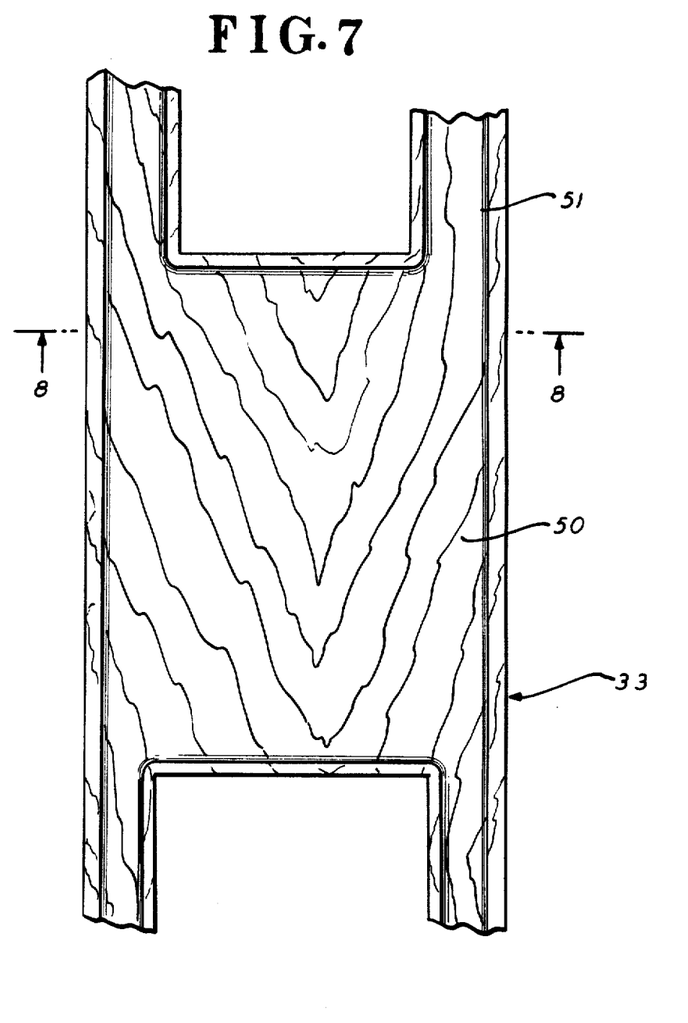
FIG. 7 is a fragmentary, top plan view of a plastic article decorated pursuant to the invention.

In practice the cross sectional thickness, dimensions, angles and recesses of decorating portion 32 of strip 31 may not be appreciable or discernable to the naked eye when viewing the final product, such as the molding 50 exemplarily shown in FIGS. 7 and 8; the dimensions of surface decoration 51 are there shown greatly exaggerated to facilitate viewing and considering the same.

In the heating and molding procedures, the plastic parts, as heated and formed, press and adhere against the length of decorating tape in the molds, which is thereby thermally activated with the substrate article so being formed. The carrier layer 31 separates from the underlying layers as the release coating 34, activated at molding temperatures, loses consistency and melts or no longer holds the underlying coatings, thus permitting them to strip away and adhere to the substrate. Thus the decorating portions 32 of the tape (below further described) form and become the surface decoration of the article, as molded.

When the completed molded and decorated plastic article, pursuant to the invention is removed or ejected from the molding machine on completion of the molding cycle, the article will thus present the appearance of being made of the material simulated by the decorating portions 51 (FIG. 7).

Tape 26

Figure 3:
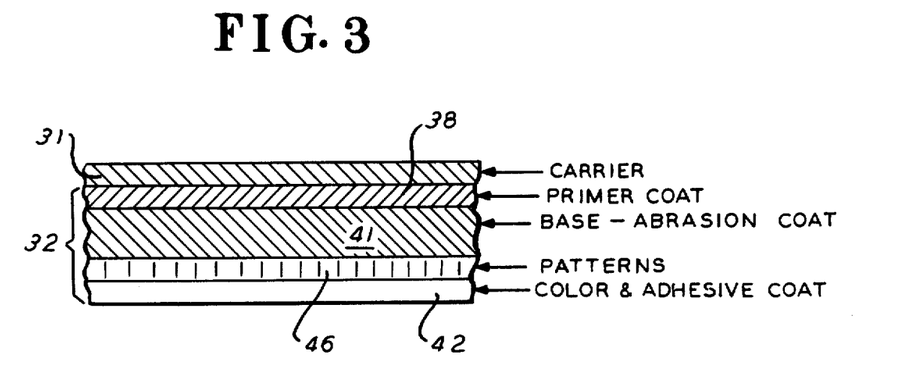
FIG. 3 is an enlarged, vertical, fragmentary, sectional view of a portion of an exemplary form of decorating strip or tape embodying invention.
Figure 4:
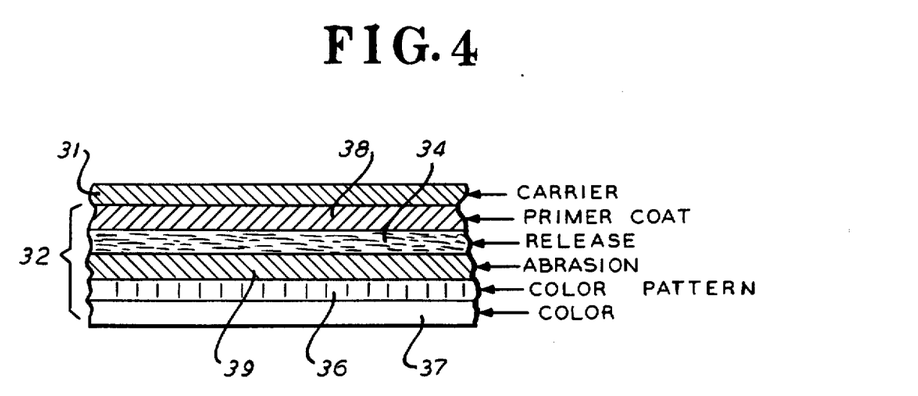
FIGS. 4, 5 and 6 are similar views of other forms thereof.
Figure 5:
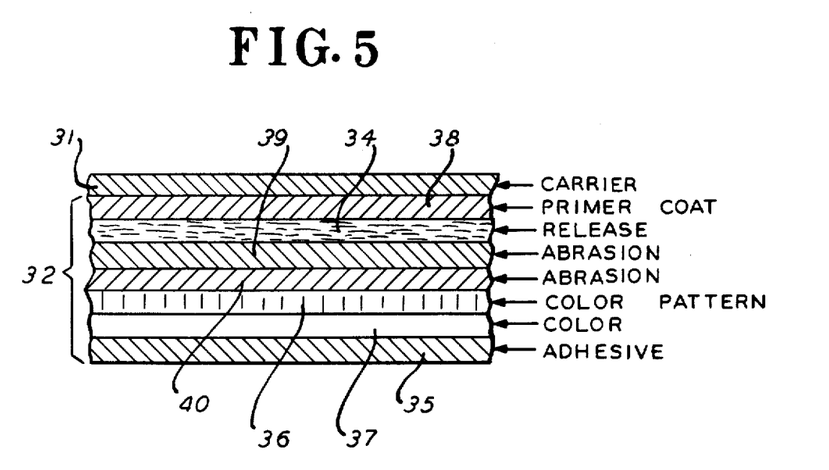
Figure 6:
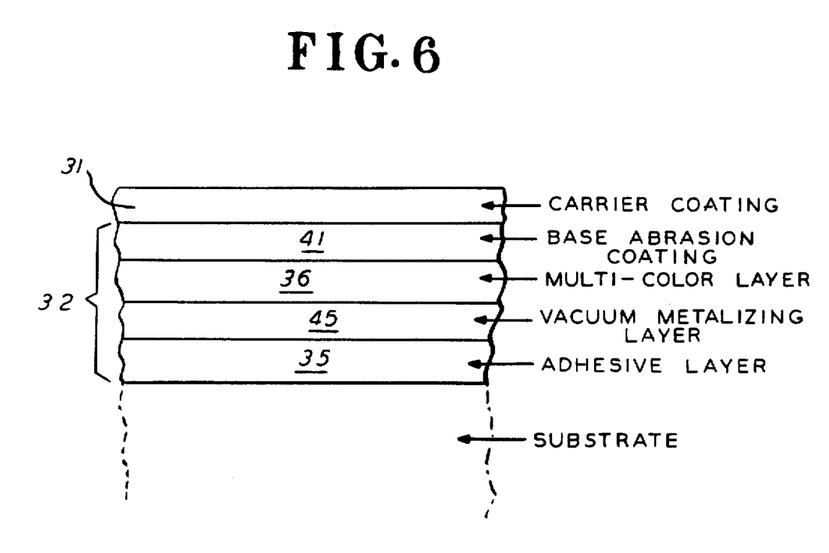

The disclosures herein and in the drawing exemplify the form and composition of tape 26, which may be varied to achieve desired characteristics and qualities in the molding procedures and decoration requirements. Exemplarily, decorating portion 32 of tape 26 may include a release layer or coating 34 formed as a separate layer or coating (FIGS. 4, 5) or combined with other materials (FIG. 3). Decorating coating layers 32 may further include a separate adhesive coating layer 35 (FIGS. 5, 6) or (FIGS. 3 and 4) combined with color material as 42. Color coating 36 may be a single color-coating or multi-color coating (FIG. 6) or may be provided in addition to or combined with color patterns (36, 37, FIGS. 4 and 5) or with adhesive coating as at 42 (FIG. 3). A primer coating 38 may be coated onto carrier 31 (FIGS. 4, 5) or base-abrasion coating 41 (FIGS. 3 and 6). Multiple abrasion coatings 39 and 40 may be provided (FIG. 5). Color and pattern coatings may be of any desired color or combination of colors.

The following tables exemplify ranges and materials and formulations for tape 26 and its carrier coating 31, which is stable throughout the molding temperature ranges, and decorating coatings 32 which are inert at room temperature and are automatically in-mold activated at molding temperatures.

Carrier or Web (Film) 31

Carrier web or film 31 is the medium on which the coatings and formulations of tape 26 are fixed, using gravure printing, silk screen printing, reverse roll coating or any other method of applying coatings. The carrier 31 is made of materials stable at room temperature and throughout the molding range temperatures, in carrying out the invention. The carrier 31 may be any carrier suitable for the purposes and objectives herein disclosed; such as any of the following: Polyester Mylar (trademark of the DuPont Company) polypropylene cast film, Nylon Ionomer, polyurethane elastomer, polycarbonate. These materials are formed as film extrusions or cast to have the ability to conform and track and combine, in the molding cycle, with the article-defining contours of the mold, and may have a thickness such as (and without limitation thereto) approximately ½ to 3 mil.

Primer Coating 38

The function of the primer coating 38 is to provide release for the following coatings and to prevent the coating and tape from bursting during molding processing. Typical examples of materials suitable for use as primer coating 38 are: Photo cured System; Polyester Vitel PE200; Union Carbide VAGH; Union Carbide VMCH (Firestone FPC 470); Union Carbide VYNS (Firestone FPC 481); Silicone Release Agents (Corning or Dow Chemical); MEK, MIBK, Toluol, Dioxane, Tetrahydrofuran.

Release Coating 34

Release coating 34 holds the underlying coatings to the carrier 31 at room temperatures and until the molding temperatures are reached, at which time coating 34 becomes unstable and permits separation of carrier 31 from the remaining coatings. Typical examples of materials suitable for release coating 34 are: Ouricury Wax, Petroleum Wax, Microcrystalline Was, Toluol, Tricholorethylene, Zylol, MOntan Wax, Carnauba Wax, Bee's Wax.

Release coat 34, typically comprising a 0.02–0.05 mil. layer or coating of a natural or synthetic wax, (or mixtures thereof) which layer can initially be deposited as a solution of such wax in a suitable solvent. A typical formulation may thus include, e.g., 50 grams of a petroleum wax in 5 gallons of benzene as a solvent. The function of release coat 34 is to enable separation of those components of tape 26 which, for example, in FIG. 5, are disposed beneath the release coat, from the carrier 31 (and a primer coat therebelow if desired) in the molding heat and pressure cycle.

The following is an exemplary chart thereon:

| RELEASE COAT 34 | 1 | 2 | 3 | 4 | 5 |
|---|---|---|---|---|---|
| Petroleum Wax | 2 | | | | |
| Montan Wax | | 5 | | | |
| Carnauba Wax | | | 5 | | |
| Bee's Wax | 2 | | | 5 | |
| Microcrystalline Wax | | | | | 5 |
| Toluol | | 50 | 50 | 50 | 50 |
| Trichloroethylene | 91 | | | | |
| Xylol | 5 | 45 | 45 | 45 | 45 | bonds with release coat 34. Coat 39 typically may have a formed thickness of the order of 0.025 to 0.2 mil.

Typical examples of materials suitable for abrasion or base coat 41 are: Methyl Methacrylate (Medium Molecular Weight); VMCH (Union Carbide) FPC 470 (Firestone; VAGH (Union Carbide); Micronized Polyethylene; Zylol; Toluol; MEK; MIBK; Aluminum Oxide; Aluminum Hydrate.

The following is an exemplary chart thereon:

| ABRASION OR BASE COAT 41 | 1 | 2 | 3 | 4 | 5 | 6 |
|---|---|---|---|---|---|---|
| Neocryl B-728 Methacrylate Polyvinyl Chemical Polymer Industries | 5 | 5 | 5 | 20 | 15 | |
| Union Carbide VYNS Vinyl Resin | | | 15 | | | |
| Firestone FPG 481 Vinyl Resin | | 15 | | | | |
| Union Carbide VAGH Vinyl Resin | 15 | | | | | |
| Methyl Isobutyl Ketone | 10 | 5 | 10 | 10 | 10 | 10 |
| Toluol | 25 | 30 | 25 | 24 | 30 | 30 |
| Methyl Ethyl Ketone | 40 | 40 | 40 | 40 | 40 | 40 |
| Micronized Polyethylene | 5 | 5 | 5 | 5 | 5 | 5 |
| Aluminum Oxide | | | | 1 | | |
| Methyl Methacrylate | | | | | | 15 |
| CURING TEMPERATURE °F. | 260° | 260° | 260° | 260° | 260° | 260° |
| CURING TIME, SECONDS | 50 | 50 | 50 | 50 | 50 | 50 |
| COATING WT. - LBS./REAM | 2 | 2 | 2 | 2 | 2 | 2 |

Abrasion or Base Coat 41 (or 39)

The function of abrasion or base coating 41 is to provide a hard finish on the surface of the decorated part that is mar and scuff resistant, and readily conforms to the article contours under pressure during the molding processes. It comprises the uppermost layer of decorating portion 32 of the tape. Accordingly, coat 39 should be relatively tough, to protect the underlying, softer layers and to hold onto the wax coating until heat and pressure are applied. The coat 39 may comprise an acrylic composition or vinyl-like plastic or cellulose acetate or other reasonably wear-resistant and substantially transparent materials, which do not form strong

Grain, Pattern or First Color Coat 36

The function of grain pattern or first color coating 36 is decorative.

Typical examples of materials suitable for coating 36 are: Acrylic resin; Vinyl; Nitrocellulose ½ sec. R.S.; Pigments; White $TiO_2$; Carbon Black; Any combination of Pigments; Toluol; Ethanol.

The following is an exemplary chart thereon:

| (a first color coat) GRAIN PATTERN 36 | 1 | 2 | 3 | 4 | 5 | 6 | 7 | 8 | 9 |
|---|---|---|---|---|---|---|---|---|---|
| Neocryl B-728 Methacrylate Polyvinyl Chemical Polymer Industries | 10 | | | 10 | | 10 | 10 | | |
| UNION CARBIDE VMCH Vinyl Resin | | 10 | | | | | | 10 | |
| FIRESTONE FPC 497 VYHH Vinyl Resin | | | 10 | | | 5 | | | |
| HERCULES Parlon Resin | | | | | 25 | | | 20 | |
| NITROCELLULOSE ½ Sec. R.S. | | | | 10 | | | | | |
| Methacrylate Polymer Neocryl B-725 | | | | | | | | | 20 |
| PIGMENTS (any combination of Pigments) | 15 | 15 | 20 | 10 | 10 | 15 | 15 | 10 | 15 |
| Toluol | | 20 | 35 | 35 | 30 | 35 | | | 50 |
| Methyl Ethyl Ketone | | 35 | 35 | 35 | 35 | 35 | | | 15 |
| Acetone | 75 | 20 | | | | | | | |
| CURING TEMPERATURE °F. | 225 | 225 | 225 | 225 | 225 | 225 | 225 | 225 | 225 |
| COATING WEIGHT, POUNDS/REAM | 1 | 1 | 1 | 1 | 1 | 1 | 1 | 1 | 1 |

Decorative coating, generally designated at 36, may thus comprise one of more coatings of color patterns and may comprise the actual visual ("color") pattern to be observed in the ultimately decorated product. Thus, decorative coating 36 might provide a grain pattern, suggestive of a particular type or color of leather and may be formed of a number of sub-layers for the grained pattern, depending on the desired visual effect. Complementary or varying color effects; in other cases, as those wherein the decorative pattern is intended to represent other types of textured materials only a single layer may be required. Such layer may, for example, be of uniformly black, brown, or other color. Color coating 36, may be applied by any techniques known in the art, including, exemplarily, gravure printing of inks and/or silk screen printing.

A multi-color printed pattern may comprise a layer or successive sub-layers (36, 37, FIG. 5; 36, FIG. 6) of overprinted colors, the compound effect of which is to simulate a marble grain, etc. These designs, symbols, graphics, etc. may be deposited by gravure or silk screen printings or by other techniques, registration of successive printings being used to achieve desired color combinations.

Adhesive Coat 35

The adhesive coating 35 promotes adhesion and unification of the decorating tape to the substrate article or other substrate material decorated thereby in the molding procedure pursuant to the invention. Coating 35 is selected from materials compatible with and having a natural bonding characteristic for uniting the decorating coatings of the tape to the article being molded and providing flow control during the molding operations. Typical examples of materials suitable for adhesive coating 35 are: Acrylic Resins; ABS Resins; Extender Pigments; Vinyl Acetate; Vinyl Butyrate; Vinyl Chloride Copolymers; Ethanol; Toluol; Xylol; MEK; Acetone.

The following is an exemplary chart thereon.

| ADHESIVE COAT 35 | 1 | 2 | 3 | 4 | 5 | 6 |
|---|---|---|---|---|---|---|
| Neocryl B-750 Acrylic Copolymer POLVINYL CHEMICALS, INC. | 15 | | 15 | | 10 | |
| Acryloid B72 Acrylic Copolymer ROHM & HAAS | | 15 | | 15 | | |
| Nitrocellulose ½ Sec R.S. | | | 5 | | 10 | |
| Pigment | 5 | 5 | 5 | 5 | 5 | 5 |
| ACRYLONITRILE BUTADIENE STYRENE ABS | | | | | | 20 |
| Isopropanol | 35 | 70 | | | 25 | |
| Ethanol | 35 | | 65 | 20 | | |
| Acetone | 10 | 10 | 10 | | 25 | |
| Toluol | | | | 60 | 25 | 75 |
| CURING TIME, SECONDS | 5 | 5 | 5 | 5 | 5 | 5 |
| CURING TEMPERATURE, °F. | 200 | 200 | 200 | 200 | 200 | 200 |
| COATING WEIGHT, POUNDS/REAM | 5 | 5 | 5 | 5 | 5 | 5 |

Second Color Coat 37

The functions of second color coating 37 are decorative and adhesive and to assure flow control of the coatings during the molding operation. Typical materials suitable for second color coating 37 are: Methyl Methacrylate; Acrylic Thermoset Resin; VMCH (Union Carbide) FPC 470 (Firestone); Urea Type Resin; Catalyst Paratoluene Sulfonic Acid; Curing Agents; Nitrocellulose; Ethanol; Toluol; Xylol; MEK; MIBK.

The following is an exemplary chart thereon;

Molds and mold cooling and heating means and controls therefor such as herein above referred to are conventional and well known in the art, including means for controlling molding cycles, for actuating the molds and plungers and adhesives coating means; for example "Tool Engineers Handbook", published by the *American Society of Tool Engineers,* Detroit, Michigan (1949) first edition, pages 392-299 recited, old in the art:

Molds and cavities; plungers [page 398] (also at pages 396,397,395) cooling channels, pressure and curing heat procedures, paragraphs 1-6, top half of page 392, as

| COLOR COAT 37 | 1 | 2 | 3 | 4 | 5 | 6 |
|---|---|---|---|---|---|---|
| Methyl Methacrylate | 20 | | | | | |
| Neocryl B-728 POLYVINYL CHEMICAL | | | | | | |
| Acrylic Thermosetting Resin, A-T50 ROHM & HAAS | | 20 | | 20 | | |
| UNION CARBIDE VMCH Vinyl Resin | | | 20 | | | |
| ROHM & HAAS Uformite #240 Urea Formaldehyde | | | | 20 | | |
| P-Toluene Sulfonic Acid | | | | 1 | | |
| ABS - Acrylonitrile-Butadiene-Styrene BORG WARNER | | | | | 20 | |
| Parlon Resin HERCULES, INC. | | | | | | 20 |
| Methyl Ethyl Ketone | 20 | 20 | 20 | 20 | 20 | |
| Toluol | 30 | 30 | 30 | 10 | 30 | 70 |
| Methyl Isobutyl Ketone | 20 | 20 | 20 | 20 | 20 | |
| Iron Oxide Red | 4 | 5 | 4 | 1 | 3 | 3 |
| Chrome Yellow | 2 | 2 | 2 | 2 | 3 | 3 |
| TiO₂ | 1 | 1 | 1 | 1 | 1 | 1 |
| Carbon Black | 1 | 1 | 1 | 1 | 1 | 1 |
| Molybdate Orange | 2 | 2 | 2 | 5 | 2 | 2 |
| CURING TEMPERATURE °F. | 225 | 225 | 225 | 225 | 225 | 225 |
| CURING TIME SECONDS | 10 | 10 | 10 | 30 | 10 | 10 |
| COATING WEIGHT, POUNDS/REAM | 10 | 10 | 10 | 10 | 10 | 10 | well as (top of same page) automatic presses for "loading of material, adjustment of molding cycle, and transporting away of the finished parts". "Pressure, temperature and time variables" are mentioned at top half of page 395 alongside the (viscosity-time chart); plastic feeding procedures and automatic controls for time, pressure and temperature and feeding requirements, heating units and water cooling provisions for chilling the mold at the proper time and described at the lower half of page 397.

I claim:

1. A method of automatically, in mold, decorating an article formed of heated plastic material, as said plastic material flows in and fills the molds, to form said articles in the molding cycle comprising:
    (a) positioning a decorating tape in said molds, said tape having a carrier layer and a decorative portion releasable from said carrier layer by the flow and pressure of said heated plastic material introduced into said molds;
    (b) filling said molds with plastic material;
    (c) causing said plastic material to flow into and fill said molds and to activate said decorative portion of said tape;
    thereby automatically uniting the tape of decorating material and article;
    producing a unitary and decorated plastic article in said molding cycle; and
    (d) removing substantially the entire released carrier layer from the molds.

2. In the method of automatically, in-mold, decorating articles, as set forth in claim 1, the further steps comprising:
    preforming said tape of continuous length, equal to multiples of the length of said molds to be so positioned in the molds, prior to so positioning said tape in the molds,
    and moving such length of said tape into and through the molds sequentially for so decorating said articles in sequential molding cycles.

3. In the method of automatically, in-mold, decorating articles, as set forth in claim 2, the further steps comprising:
    maintaining said tape so positioned in the molds for each of said molding cycles.

4. In the method of automatically, in mold, decorating articles, as set forth in claim 1, the further step comprising
    heating said mold.

5. In the method of automatically, in mold, decorating articles, as set forth in claim 1, the further steps comprising:
    heating said molds; and
    cooling the molds for forming said articles complete and decorated.

6. In the method of automatically, in mold, decorating articles as set forth in claim 1, the further steps comprising:
    heating said molds; and
    cooling the mold adjacent the carrier layer of the tape.

7. In the method of automatically, in-mold decorating articles as set forth in claim 1, the further steps comprising:
    forming said molds with a cavity portion of the form of the articles to be molded,
    forming said molds with a plunger portion complementary to said cavity mold portion,
    and so positioning said tape intermediate said mold plunger and mold cavity portions, to so form the unitary decorated, articles therebetween.

8. In the method of automatically, in-mold decorating articles, as set forth in claim 1, the further steps comprising:
    so positioning a tape in the molds from a supply source and to a take-up source outwardly of the molds,
    and so positioning the tape in the molds intermediate said supply and take-up source.

9. In the method of automatically, in-mold decorating articles, as set forth in claim 1, the further steps comprising:
    so positioning a tape in the molds from a supply source and to a take-up source, outwardly of the molds,
    positioning the tape intermediate the supply and take-up sources, and
    positioning said supply and take-up sources substantially in the plane of said strip so disposed in the molds.

10. The method of automatically, in mold, decorating articles, as set forth in claim 1 wherein:
    the decorative portion includes an adhesive coating for further adherence to the article so formed in the molding cycle.

11. The method of claim 1 wherein said decorating tape further comprises a primer coating underlying said carrier layer.

12. The method of claim 1 wherein said decorative portion of said tape further comprises an abrasive layer.

13. The method of claim 1 wherein said decorating tape further comprises a carrier release layer.

14. In the method of automatically, in-mold decorating articles, as set forth in claim 1, the further steps comprising:
    forming said molds with interfacing portions, and
    positioning a continuous length of said tape adjacent said molds, so disposing a length thereof in the molds and at said interface portions thereof.

15. In the method of automatically, in-mold decorating articles as set forth in claim 1, the further steps comprising:
    forming the molds with cavity portions of the intended forms of said articles, and
    so disposing a length of decorating tape in place thereof in the molds and at said cavity portions.

16. In the method of automatically, in-mold decorating articles, as set forth in claim 1, the further steps comprising:
    pre-positioning the tape, during the molding cycle, intermediate the molds, and
    moving the tape so pre-positioned out of the molds, on completion of the molding cycle.

17. In the method of automatically, in-mold decorating articles as set forth in claim 1, the further steps comprising:
    heating the molds, to cause the plastic materials to flow into and fill said molds, and to thereby so interface and unite with the material decorating tape,
    and cooling the molds to produce said so decorated and completed plastic articles.

18. In the method of automatically, in-mold decorating articles, as set forth in claim 17, the further step comprising:
    forming said tape with a carrier face portion of the tape thermally inert to the so-heated molds.

19. In the method of automatically, in-mold decorating articles as set forth in claim 1, the further steps comprising:
removing the so decorated articles, on completion of the molding cycle,
and positioning a further length of decorating material into the molds, to repeat the molding decorating cycle.

20. A method of decorating an article during the molding of said article from a heated plastic material in a mold cavity having the shape of said article, said mold cavity formed by the union of mold members comprising:
(a) positioning in said mold cavity a tape having a carrier layer and a decorative portion including an adhesive layer facing the direction of entry of plastic material into said mold cavity, said decorative portion being releasable from said carrier layer by the flow and pressure of said heated plastic material;
(b) filling said mold cavity with a plastic material under heat and pressure, causing said plastic material to contact said decorative portion and bond said tape to said article as it is formed and thereby releasing said carrier layer;
(c) allowing said plastic material to form said article having said tape bonded thereto;
(d) removing a decorated molded article from said mold cavity; and
(e) removing substantially the entire released carrier layer from said mold, thereby advancing said tape through said mold members.

21. The method of claim 20 wherein said tape further comprises a primer coating underlying said carrier layer.

22. The method of claim 20 wherein said decorative portion of said tape further comprises an abrasive layer.

23. The method of claim 20 wherein said tape further comprises a carrier release layer.

24. A continuous method of decorating articles during the molding of said articles from a heated plastic material in a mold cavity having the shape of said article, said mold cavity formed by the union of mold members comprising:
(a) positioning in said mold cavity a predetermined length of tape from a continuous source of supply of said tape, said tape having a carrier layer and a decorative portion including a thermally activatable adhesive layer facing the direction of entry of plastic material into said mold cavity, said decorative portion being releasable from said carrier layer by the flow and pressure of said heated plastic material
(b) filling said mold cavity with a plastic material under heat and pressure causing said plastic material to contact said decorative portion and bond said length of tape to said article as it is formed and thereby releasing said carrier layer;
(c) allowing said plastic material to form said article having said length of tape bonded thereto;
(d) removing a decorated molded article from said mold cavity;
(e) removing substantially the entire released carrier layer from said mold, thereby advancing said length of tape through said mold members by means of said carrier layer a next predetermined length; and
(f) repeating steps (b) to (e) continuously to produce a plurality of decorated molded articles.

25. The method of claim 24 wherein said tape further comprises a primer coating underlying said carrier layer.

26. The method of claim 24 wherein said decorative portion of said tape further comprises an abrasive layer.

27. The method of claim 24 wherein said tape further comprises a carrier release layer.

* * * * *